Aug. 5, 1952 J. W. COLVIN 2,605,534
CORE FOR USE IN MOLDING CONCRETE PIPE IN SITU
Filed Jan. 31, 1949 4 Sheets-Sheet 1
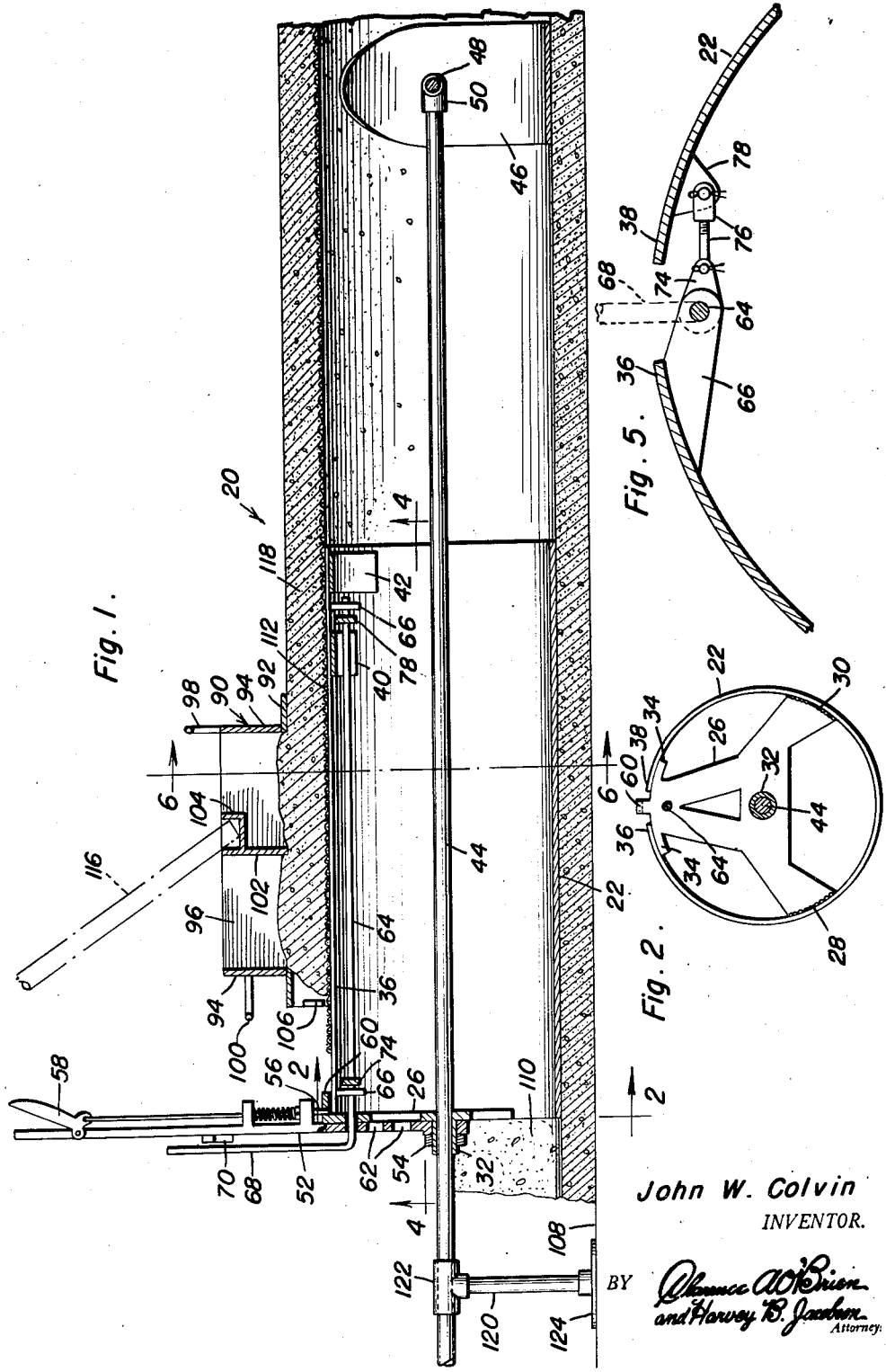
John W. Colvin
INVENTOR.

Aug. 5, 1952　　　　　　J. W. COLVIN　　　　　2,605,534
CORE FOR USE IN MOLDING CONCRETE PIPE IN SITU
Filed Jan. 31, 1949　　　　　　　　　　　　　　4 Sheets-Sheet 2
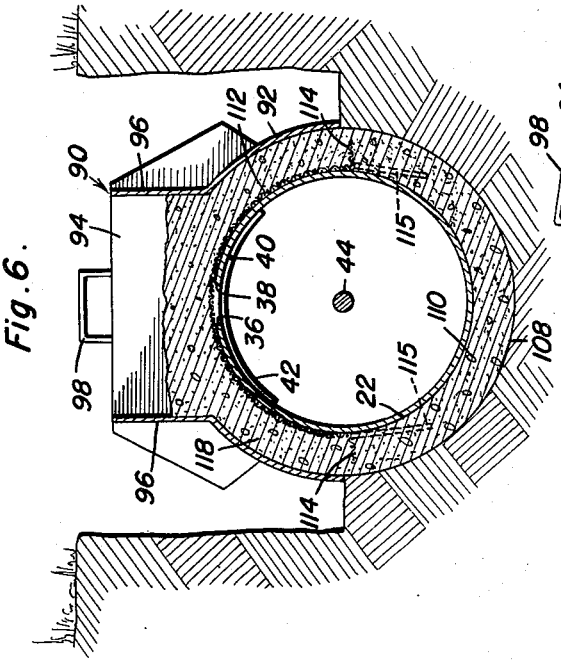
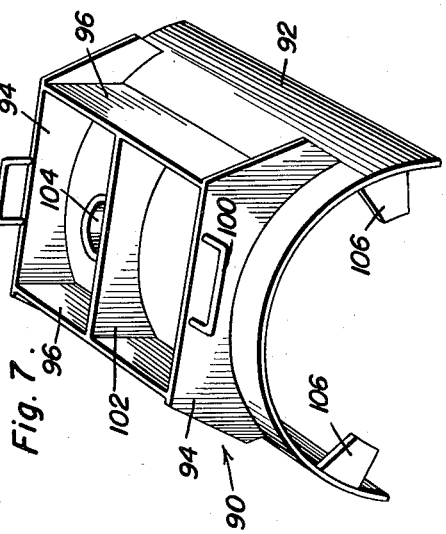
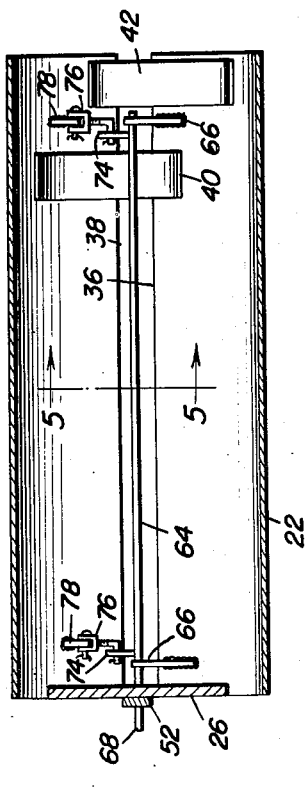
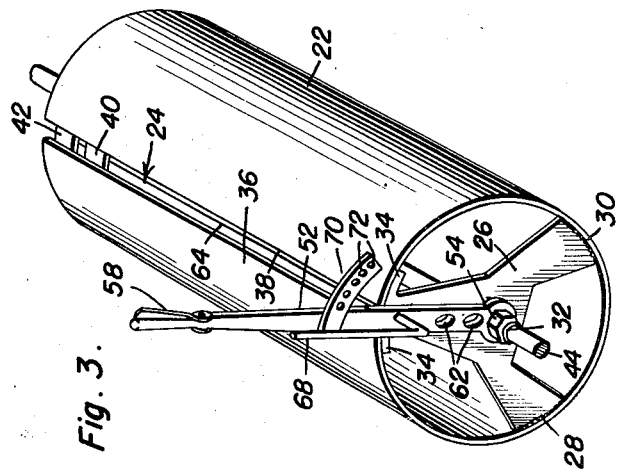
John W. Colvin
*INVENTOR.*

Aug. 5, 1952  J. W. COLVIN  2,605,534
CORE FOR USE IN MOLDING CONCRETE PIPE IN SITU
Filed Jan. 31, 1949  4 Sheets-Sheet 3
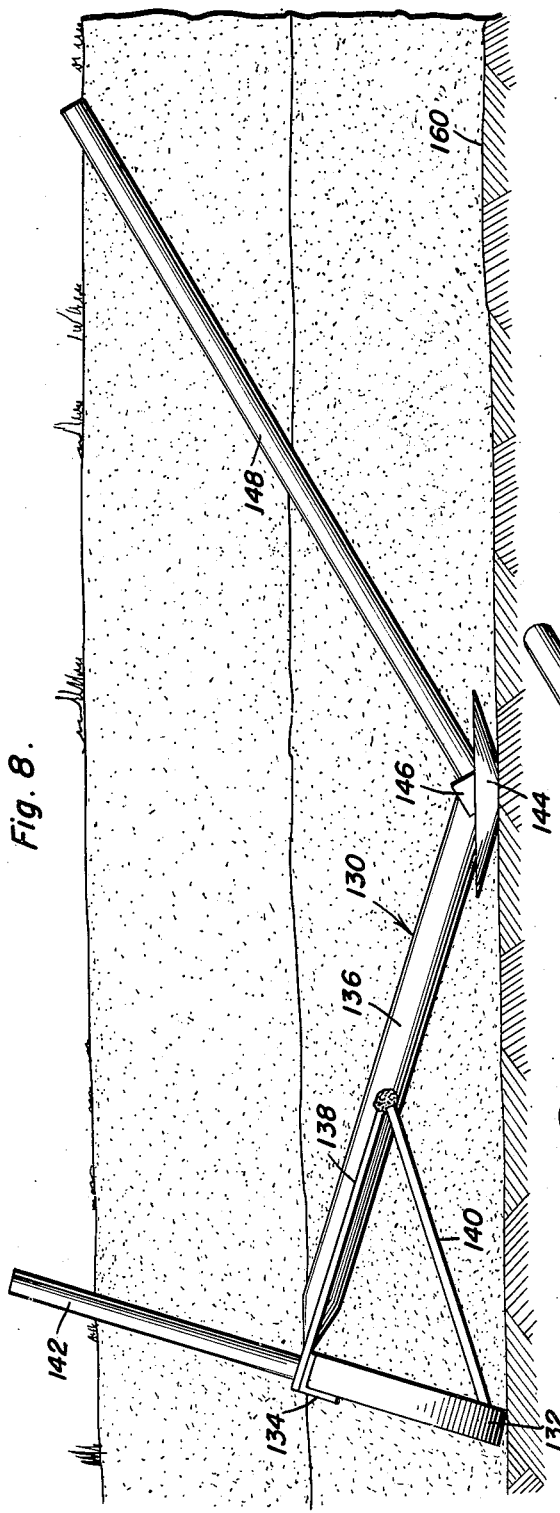
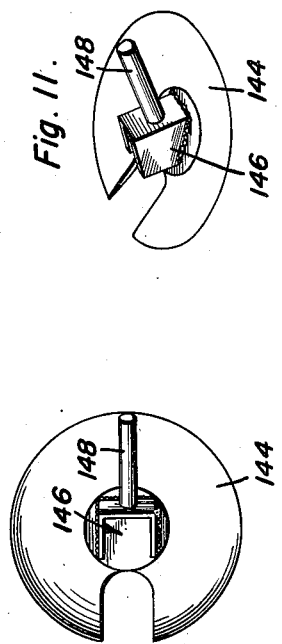
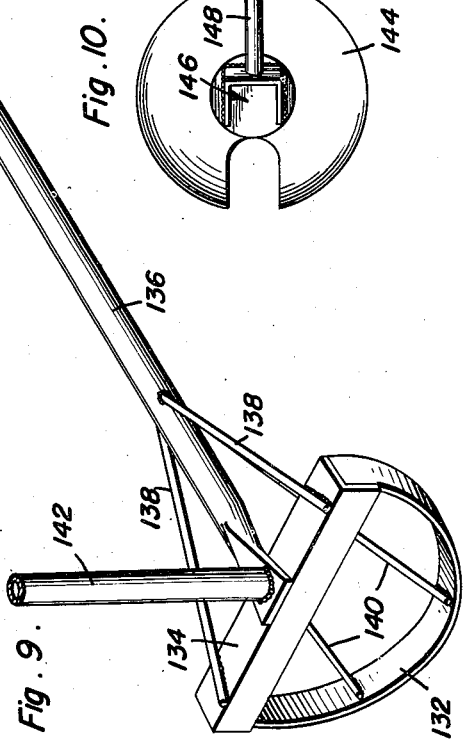
John W. Colvin
INVENTOR.

Aug. 5, 1952     J. W. COLVIN     2,605,534
CORE FOR USE IN MOLDING CONCRETE PIPE IN SITU
Filed Jan. 31, 1949     4 Sheets-Sheet 4
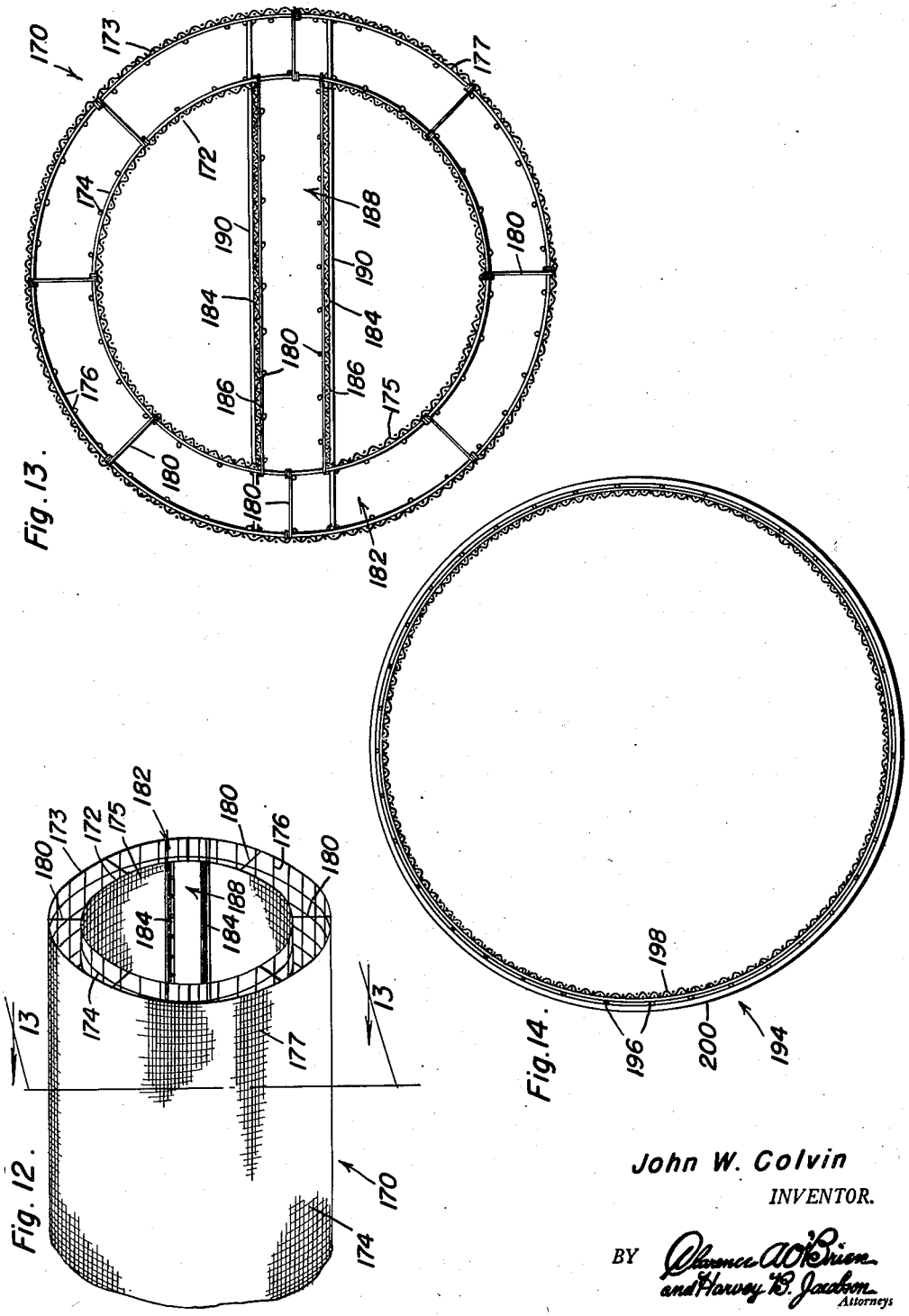
John W. Colvin
INVENTOR.

Patented Aug. 5, 1952

2,605,534

UNITED STATES PATENT OFFICE 2,605,534

CORE FOR USE IN MOLDING CONCRETE PIPE IN SITU

John W. Colvin, Glendale, Ariz.

Application January 31, 1949, Serial No. 73,817

1 Claim. (Cl. 25—128)

This invention relates to new and useful improvements and structural refinements in machinery for pouring and forming concrete pipes, and the principal object of the invention is to facilitate the performance of the pipe pouring operation with expedience and with the expenditure of a minimum amount of labor.

In particular, the instant invention pertains to improvements in the apparatus which constitutes the subject matter of my United States Patent No. 2,306,037, granted on December 22, 1942. While experimenting with the apparatus constructed in accordance with the teachings of this prior patent, I found that the machinery lends itself to certain structural and utilitarian improvements, and it is, therefore, another feature of the instant invention to provide apparatus in which such improvements are embodied.

In effect, the apparatus herein involved consists of means for forming and finishing the pipe poured in the ditch.

The instant invention contemplates the provision of the apparatus as above outlined which is simple in construction, which may be conveniently and expeditiously manipulated, and which will readily lend itself to economical manufacture.

With the above more important objects and features in view, and such other objects and features as may become apparent as this specification proceeds, the invention consists essentially of the arrangement and construction of parts as illustrated in the accompanying drawings, in which:

Figure 1 is a longitudinal cross-sectional view of the pipe forming and shaping means used in the invention, the same being shown in use;

Figure 2 is a cross-sectional view of the pipe forming means per se, this view being taken substantially in the plane of the line 2—2 in Figure 1;

Figure 3 is a perspective view of the pipe forming means;

Figure 4 is a cross-sectional view, taken substantially in the plane of the line 4—4 in Figure 1;

Figure 5 is a fragmentary cross-sectional view, taken substantially in the plane of the line 5—5 in Figure 4;

Figure 6 is a cross-sectional view, taken substantially in the plane of the line 6—6 in Figure 1;

Figure 7 is a perspective view of a setting box used in association with the device shown in Figure 3;

Figure 8 is a side elevational view of a ditch former used in the invention;

Figure 9 is a fragmentary perspective view of the grading blade and tongue shown in Figure 8;

Figure 10 is a top plan view of the cutting disc shown in Figure 8;

Figure 11 is a perspective view of the disc shown in Figures 8 and 10;

Figure 12 is a fragmentary view of a reinforcement such as may be used in concrete pipes generally;

Figure 13 is a cross-sectional view, taken substantially in the plane of the line 13—13 in Figure 12; and Figure 14 is an end view of a modified form of the reinforcement.

Like characters of reference are employed to designate like parts in the specification and throughout the several views.

It may be explained at this point that in the interest of simplicity of description the apparatus will be dealt with under three separate headings, each being devoted to one of the sub-assemblies.

PIPE FORMING AND SHAPING MEANS

See Figures 1–7 inclusively

The pipe forming and shaping means are designated generally by the reference character 20 and embody in their construction a substantially tubular core 22 provided with a longitudinally extending split 24 so that it may be expanded and contracted by means of a mechanism hereinafter described. A substantially A-shaped frame 26 is welded or otherwise suitably secured at two points as at 28, 30 to one end of the core 22, the center portion of this frame being formed integrally with an externally screw-threaded nipple 32, as will be clearly apparent. The apex portion of the frame 26 is formed integrally with a pair of laterally extending, arcuate shoulders 34 which supportably engage and guide the inner surfaces of the split edge portions 36, 38 of the core 22, as is best shown in Figures 2 and 3.

Moreover, arcuate straps 40, 42 are secured to the respective split edge portions 36, 38 at the remaining end portion of the core 22, these straps serving to further guide the expanding and contracting movements of the split edge portions and preventing the entire core from collapsing.

A rod 44 slidably and rotatably extends through the nipple 32 and through the core 22, the rod 44 carries passing through the core 22, the rod 44 carries what may be called an inside finisher 46. This finisher simply assumes the form of an arcuate plate of a substantially smaller diameter than the core 22, the plate from which the finisher 46 is formed being equipped with a transverse bar 48 so that it may be connected by means of a T 50 to the rod 44, as shown in Figure 1.

A hand lever 52 is pivotally mounted on the nipple 32 on which it is retained by means of a suitable nut 54, the lever 52 extending upwardly from the frame 26 and carrying a spring-pressed latch 56 actuated by a suitable control 58. The latch 56 is removably receivable in a suitable aperture formed in an angulated bracket 60 which is provided at the apex of the frame 26, and it is to be noted that the lever 52 is also formed with a plurality of apertures 62 to selectively accommodate the nipple (32) on forming cores of various diameters.

A suitable shaft 64 is rotatably journaled in a pair of brackets 66 secured to the core edge portion 36, the shaft 64 extending rotatably through registrable apertures formed in the frame 26 and the lever 52, and terminating in an upwardly extending handle 68 which is movable over a segment 70 mounted on the lever 52, as is best shown in Figure 3. The segment 70 is provided with a plurality of apertures 72 to receive one or more pins (not shown) for locking the handle 68 in a predetermined position with respect to the segment, and it will be also noted that the shaft 64 is equipped with a pair of cranks 74 each of which is operatively connected by an adjustable clevis assembly 76 to a bracket 78 secured to the core edge portion 38, as is best shown in Figures 4 and 5.

It will be apparent that by virtue of this arrangement, movement of the handle 68 from one side to the other will cause the core 22 to expand or contract as desired, it being possible to releasably retain the core in a contracted, partially expanded or fully expanded position by simply inserting suitable keeper pins in the apertures 72 of the segment 70, as has been already outlined.

The forming and shaping apparatus also contemplates the provision of what may be referred to as a setting box 90, this consisting of a substantially semi-cylindrical plate 92 formed with an opening at the edges of which are provided upstanding flanges 94, 96, these constituting what may be called a concrete receptacle disposed at the convex side of the plate 92, substantially as shown.

Suitable handles 98, 100 are provided on the flanges 94, and a transverse partition 102 is secured intermediate the ends of the flanges 96 and carries a vibrator receiving pocket 104. Finally, a plurality of pipe thickness defining spacers or lugs 106 are secured to the concave surface at one end of the plate 92, substantially as shown.

When this portion of the apparatus is placed in use, a substantially semi-cylindrical ditch 108 is formed in the ground and is partially filled with concrete, and before this concrete fill sets, the core 22 is positioned in the ditch so that the concrete assumes a substantially semi-tubular configuration in the bottom of the ditch, as indicated at 110 in Figures 1 and 6. Thereupon the ditch and the core 22 are covered by a substantially semi-tubular reinforcing mesh 112 having out-turned lower edge portions as at 114 (see Figure 6), and the setting box 90 is positioned on the mesh 112, as shown.

If desired, the lower edges of the mesh 112 need not be provided with the outturned portions 114, but may be equipped with downward extensions embedded in the lower half-sections of the pipe as indicated at 115 in Figure 6, so as to substantially reinforce the longitudinal joints between the upper and lower pipe sections.

Concrete may then be poured into the receptacle defined by the flanges 94, 96 of the box 90, and a suitable vibrator, such as for example, a pneumatic vibrator indicated at 116, is applied to the pocket 104 so that the entire box 90 is subjected to vibration and the concrete is tamped and caused to gravitate into the space between the mesh 112 and the concave surface of the plate 92, thus constituting a cylindrical complement 118 of the pipe being poured.

As soon as the vibrating and tamping operation is completed, the core 22 may be contracted by manipulating the handle 68, whereupon the finisher 46 may be manipulated through the medium of the rod 44 so as to smooth or shape the inside diameter of the pipe.

It is to be observed that the pipe may be poured in a continuous manner, the core 22 and the box 90 being pulled forward by the lever 52 after a section of the pipe has been completed so that a next section may be poured to constitute a continuation of the section already formed. The lever 52 is used for pulling the core 22 as well as for swinging the core from side to side after it is contracted by the handle 68 preparatory to the forward pulling thereof. The spacers 106 assure that the distance of the plate 92 from the mesh 112 remains constant throughout the continuous pouring operation, thus maintaining the wall thickness of the pipe at a constant, predetermined dimension. The spacers 106 need be provided only at the forward end of the plate 92, its rear end portion resting on the outer circumference of the finished pipe, as is best shown in Figure 1.

To assure centralized positioning of the core 22 in the ditch 108, a stand 120 may be provided on the rod 44, the upper end of this stand being equipped with a T 122 which is slidable on the rod, while the lower end of the stand has secured thereto a plate 124 adapted to rest on the bottom of the ditch. The distance from the bottom surface of the plate 124 to the axis of the rod 44 is equal to the outside radius of the finished pipe, while the outside radius of the core 22 is equal to the inside radius of the finished pipe. Accordingly, by using the stand 120 on the rod 44, the core may be supported in a centralized position in the ditch to assure that the wall of the pipe is of the desired thickness.

When cores 22 of different diameters are employed, the lever 52 may be used selectively therewith, this being effected by simply removing the nut 54 from the nipple 32 and thereafter disengaging the lever 52 from the nipple and twisting the lever so that it becomes disengaged from the handle 68. The apertures 62, of course, facilitate use of the lever 52 on cores of different diameters, as has been already explained.

DITCH FORMING MEANS

See Figures 8–11 inclusively

The instant apparatus also contemplates the provision of means for forming and shaping the semi-cylindrical ditch in which the pipe is to be poured, this ditch former being designated generally by the reference character 130 and embodying in its construction a substantially semi-circular grading blade 132, the ends of which are secured together by means of a cross member 134. A tongue 136 is secured at one end thereof to the center of the cross member 134 and extends forwardly and downwardly therefrom, and suitable struts 138, 140 are employed for reinforcing the cross member 134 and the blade 132, respectively, to the tongue 136, as is best shown in Figure 9.

It is to be noted that the tongue 136 is disposed in a plane which is substantially perpendicular to the blade 132, and an upwardly extending handle 142 is secured to the tongue 136 at the point of attachment of the latter to the cross member 134.

A substantially convexo-concave cutter disc 144 is provided at the concave side thereof with a suitable socket 146 to movably and separably receive the free end portion of the tongue 136, and an upwardly inclined handle 148 is secured at its lower end to the socket 146, substantially as shown.

When the ditch former is placed in use, a trench is dug in the ground as indicated at 160, whereupon downward pressure is exerted by the handle bar 148 upon the cutter disc 144, causing the latter to smooth any "high spots" such as may be present in the trench. Moreover, the grading blade 132, after passing through the trench, assures that the trench or ditch is of a true, semi-cylindrical configuration, the handle bar 142 being used, of course, for guiding the entire former along the ditch, as will be clearly apparent.

CONCRETE PIPE REINFORCEMENT

See Figures 12–14 inclusively

While the reinforcement employed in the concrete pipe formed by the device 20 is in the form of a semi-tubular mesh (112) the accompanying Figures 12–14, inclusively, illustrate reinforcements such as may be effectively employed with concrete pipes generally, whether these pipes be of the horizontal variety disposed in ditches or trenches, or of the upstanding variety, such as for example, concrete silos.

One form of such reinforcements is illustrated in Figures 12 and 13, being designated generally by the reference character 170.

The reinforcement 170 embodies in its construction inner and outer tubular forms 172, 173, respectively, these being disposed in concentric, mutually spaced relation, as is best shown in Figure 13. The inner form 172 consists of a tubular core 174 of wire mesh covered on the inside with metallic lath 175, while the outer form 173 consists of a tubular core 176 covered on the outside with metallic lath 177. The two forms are rigidly secured together by radially extending struts 180, whereupon concrete may be poured into the annular space 182 between the two forms, being retained therein by the metallic lath 175, 177.

If it is desired to provide a transverse concrete partition in the poured pipe, a pair of spaced wire mesh panels 184 may be provided in the inner form 172, these being covered on their outer surfaces with metallic lath 186 and the space 188 between the panels 184 communicating with the space 182 so that after the concrete is poured, the partition will become an integral part of the wall of the pipe. Communication between the spaces 188, 182 is achieved by omitting metal lath on portions of the core 174 at the ends of the space 188, as shown in Figure 13. For reinforcing purposes a set of transverse rods 190 may be secured to the lath 186, these rods extending through the space 182 and being secured to the form 172 as well as the form 173.

The accompanying Figure 14 illustrates a modified form of a concrete pipe reinforcement, this being designated generally by the reference character 194 and consisting of a tubular, wire mesh core 196 provided on its inner surface with metal lath 198 and on the outer surface thereof with a plurality of circumferentially extending reinforcing hoops 200, this embodiment of the invention being employed when it is desired to pour a concrete pipe around the outer circumference of the reinforcement, as will be clearly apparent.

It is believed that the advantages and use of the invention will be clearly understood from the foregoing disclosure and, accordingly, further description thereof at this point is deemed unnecessary.

While in the foregoing there has been shown and described the preferred embodiments of this invention, it is to be understood that minor changes in the details of construction and arrangement of parts may be resorted to without departing from the spirit and scope of the invention as claimed.

Having described the invention, what is claimed as new is:

In an apparatus for forming concrete pipe, the combination of a spilt and substantially tubular core, a frame mounted at one end of said core, bearing brackets provided at one split edge portion of the core, a rotatable shaft extending through said brackets and through said frame, an actuating handle at one end of said shaft, shoulders provided on said frame for supporting and guiding split edge portions of the core, a crank on said shaft, and a link operatively connecting said crank to the other split edge portion of the core for expanding and contracting the latter by manipulation of said handle.

JOHN W. COLVIN.

REFERENCES CITED

The following references are of record in the file of this patent:

UNITED STATES PATENTS

| Number | Name | Date |
| --- | --- | --- |
| 1,191,731 | Ransome | July 18, 1916 |
| 1,269,553 | Collins | June 11, 1918 |
| 1,452,381 | Hildebrand | Apr. 17, 1923 |
| 1,486,204 | Trullinger et al. | Mar. 11, 1924 |
| 1,540,185 | Richards | June 2, 1925 |
| 1,577,923 | Martson | Mar. 23, 1926 |
| 1,639,855 | McClelland | Aug. 23, 1927 |
| 2,052,372 | Van Voorhis | Aug. 25, 1936 |
| 2,177,221 | Mull | Oct. 24, 1939 |
| 2,306,037 | Colvin | Dec. 22, 1942 |
| 2,386,615 | Knapp | Oct. 9, 1945 |